(12) United States Patent
Tamura et al.

(10) Patent No.: US 7,859,841 B2
(45) Date of Patent: Dec. 28, 2010

(54) INFORMATION EQUIPMENT

(75) Inventors: Yuki Tamura, Kawasaki (JP);
Yoshiyasu Nakashima, Kawasaki (JP);
Shinichi Shiotsu, Kawasaki (JP); Akira Shiba, Kawasaki (JP); Koichi Yokota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/232,685

(22) Filed: Sep. 22, 2008

(65) Prior Publication Data

US 2009/0219673 A1 Sep. 3, 2009

(30) Foreign Application Priority Data

Feb. 29, 2008 (JP) .............................. 2008-050562

(51) Int. Cl.
*H05K 7/20* (2006.01)
*G06F 1/20* (2006.01)
*G05D 23/00* (2006.01)

(52) U.S. Cl. ............. 361/697; 361/679.06; 361/679.27; 361/679.47; 361/679.49; 361/679.55; 361/679.56; 361/692; 454/184; 454/358; 700/300

(58) Field of Classification Search ................................
361/679.46–679.48, 679.5, 679.54–679.55, 361/690, 694–695, 697, 704, 679.06, 679.27, 361/649.56, 692; 165/80.3, 185; 454/184, 454/347, 355, 358; 700/299–300
See application file for complete search history.

(56) References Cited

U.S. PATENT DOCUMENTS

| 6,137,468 | A | * | 10/2000 | Martinez et al. ............ 345/649 |
| 6,386,965 | B1 | * | 5/2002 | Greenwald et al. ............ 454/75 |
| 6,525,934 | B1 |   | 2/2003 | Nakanishi et al. |
| 6,878,902 | B2 | * | 4/2005 | Lyle et al. .................... 219/209 |
| 6,909,602 | B2 | * | 6/2005 | Dietrich et al. ........ 361/679.08 |
| 7,203,062 | B2 | * | 4/2007 | Tsuji .......................... 361/695 |
| 7,290,401 | B2 | * | 11/2007 | Hermerding ................. 62/186 |
| 7,382,353 | B2 | * | 6/2008 | Grady et al. ................. 345/156 |
| 2006/0105698 | A1 | * | 5/2006 | Butera et al. ................. 454/256 |
| 2008/0108292 | A1 | * | 5/2008 | De Marino et al. ............ 454/75 |

FOREIGN PATENT DOCUMENTS

| JP | 10261884 | A | * | 9/1998 |
| JP | 11-354959 |   |   | 12/1999 |
| JP | 2000-349479 |   |   | 12/2000 |
| JP | 2004-13685 |   |   | 1/2004 |
| JP | 2004268797 | A | * | 9/2004 |

* cited by examiner

*Primary Examiner*—Robert J Hoffberg
(74) *Attorney, Agent, or Firm*—Staas & Halsey LLP

(57) ABSTRACT

Information equipment includes an open/close mechanism that opens or closes exhaust ports, a cooling fan that dissipates heat in the information equipment into the air through the exhaust ports, a user state detecting part that detects a contact state in which the hand of a user is in contact with the information equipment or a closeness state in which the hand of the user is close to the information equipment, and a heat dissipation control part that controls an open/closed state of the open/close mechanism so that heat exhausted from the exhaust ports is not directed to the hand of the user that is contact with or close to the information equipment, in accordance with the contact state or the closeness state detected by the user state detecting part.

4 Claims, 14 Drawing Sheets

26a

| Logic signal of touch sensor $T_1$ | Logic signal of touch sensor $T_2$ | Logic signal of touch sensor $T_3$ | Logic signal of touch sensor $T_4$ | State signal |
|---|---|---|---|---|
| H | L | L | L | Case1 |
| L | H | L | L | Case2 |
| L | L | H | L | Case3 |
| L | L | L | H | Case4 |
| H | H | H | H | Case5 |
| L | L | L | L | Case6 |

| State signal | Control signal of open/close mechanism 22a | Control signal of open/close mechanism 22b | Control signal of open/close mechanism 22c | Control signal of open/close mechanism 22d |
|---|---|---|---|---|
| Case1 | Close | Open | Open | Open |
| Case2 | Open | Close | Open | Open |
| Case3 | Open | Open | Close | Open |
| Case4 | Open | Open | Open | Close |
| Case5 | Open | Open | Open | Open |
| Case6 | Open | Open | Open | Open |

FIG. 5

| Tilt direction | State signal |
|---|---|
| −X | Case7 |
| +X | Case8 |
| −Y | Case9 |
| +Y | Case10 |

| State signal | Control signal of open/close mechanism 22a | Control signal of open/close mechanism 22b | Control signal of open/close mechanism c | Control signal of open/close mechanism 22d |
|---|---|---|---|---|
| Case1 | Close | Open | Open | Open |
| Case2 | Open | Close | Open | Open |
| Case3 | Open | Open | Close | Open |
| Case4 | Open | Open | Open | Close |
| Case5 | Open | Open | Open | Open |
| Case6 | Open | Open | Open | Open |
| Case7 | Open | Open | Open | Close |
| Case8 | Open | Close | Open | Open |
| Case9 | Open | Open | Close | Open |
| Case10 | Close | Open | Open | Open |

INFORMATION EQUIPMENT

CROSS-REFERENCE TO RELATED APPLICATION

This application is based upon and claims the benefit of priority of the prior Japanese Patent Application No. 2008-050562, filed on Feb. 29, 2008, the entire contents of which are incorporated herein by reference.

BACKGROUND OF THE INVENTION

1. Field of the Invention

The present invention relates to information equipment that dissipates heat in the information equipment into the air through an exhaust port.

2. Description of Related Art

Recently, portable information equipment such as a laptop personal computer, a notebook personal computer, a tablet-type personal computer, a pocket personal computer, a handheld terminal (HHT), a personal digital assistant (PDA), and a wearable computer is spreading. In such information equipment, heating elements such as a CPU and a memory are provided, so that it is necessary to dissipate heat generated by these heating elements into the air through an exhaust port. Therefore, the information equipment is provided with a radiator such as a cooling fan or a Peltier element (see, for example, JP 11-354959 A or JP 2000-349479 A).

Although the information equipment may be used on a desk, it is mostly used while being held by a user. Therefore, while the radiator is dissipating heat into the air through an exhaust port, the hand of the user holding the information equipment becomes hot, which gives the user a disagreeable feeling.

In order to solve the above-mentioned problem, conventionally, information equipment has been proposed, which includes a plurality of exhaust ports, a plurality of radiators provided so as to correspond to the respective exhaust ports, and a plurality of switches that switch between ON and OFF of the respective radiators (see, for example, JP 2004-13685 A). Specifically, a user uses the switch to turn off the radiator corresponding to the exhaust port in a portion where the user holds the information equipment, and turn on the radiators corresponding to the exhaust ports in portions other than the portion where the user holds the information equipment. Consequently, heat is not dissipated from the exhaust port in the portion where the user holds the information equipment, so that the hand of the user does not become hot, which can prevent the user from being given a disagreeable feeling.

SUMMARY OF THE INVENTION

According to an aspect of the invention, information equipment having a plurality of exhaust ports, includes: an open/close mechanism that opens or closes the exhaust ports; a radiator that dissipates heat in the information equipment into the air through the exhaust ports, a user state detecting part that detects a contact state in which a hand of a user is in contact with the information equipment or a closeness state in which the hand of the user is close to the information equipment; and a heat dissipation control part that controls an open/closed state of the open/close mechanism so that heat exhausted from the exhaust ports is not directed to the hand of the user that is in contact with or close to the information equipment, in accordance with the contact state or the closeness state detected by the user state detecting part.

According to another aspect of the invention, the user state detecting part detects a contact state in which the hand of the user is in contact with the information equipment or a closeness state in which the hand of the user is close to the information equipment. The heat dissipation control part controls the open/closed state of the open/close mechanism so that heat exhausted from the exhaust ports is not directed to the hand of the user that is in contact with or close to the information equipment, in accordance with the contact state or the closeness state. This allows the heat in the information equipment to be dissipated into the air through the exhaust ports without causing time and labor for the user and without giving the user a disagreeable feeling.

BRIEF DESCRIPTION OF THE DRAWINGS

FIG. 4 is a diagram showing an example of data recorded in a held state detection table.

FIG. 5 is a diagram showing an example of data recorded in a heat dissipation control table.

FIG. 12 is a diagram showing an example of data recorded in a tilt state detection table.

FIG. 13 is a diagram showing an example of data recorded in a heat dissipation control table.

DETAILED DESCRIPTION OF THE INVENTION

Figure 1:
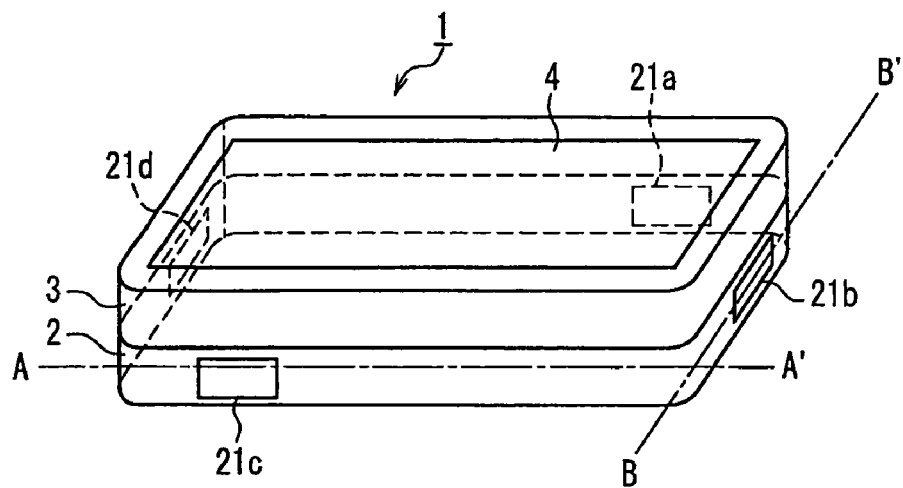
FIG. 1 is a schematic view showing an external appearance of information equipment according to Embodiment 1 of the present invention.

According to the above conventional method, every time the user holds the information equipment, the user needs to operate the switch in accordance with the held state of the information equipment, which causes time and trouble for the user.

In an embodiment of the present invention, it is preferred that the information equipment further includes a tilt state detecting part that detects a tilt state indicating a direction in which the information equipment tilts with respect to a horizontal plane, wherein the heat dissipation control part controls the open/closed state of the open/close mechanism so that heat exhausted from the exhaust ports is not directed to the user, in accordance with the tilt state detected by the tilt state detecting part.

According to the above configuration, the tilt state detecting part detects a tilt state indicating the direction in which the information equipment tilts with respect to the horizontal plane. The heat dissipation control part controls the open/closed state of the open/close mechanism so that heat exhausted from the exhaust ports is not directed to the user, in accordance with the detected tilt state. Thus, the heat dissipation control part can control the open/closed state of the open/close mechanism, considering the tilt state as well as the contact state or the closeness state. Consequently, the heat dissipation control part can place the open/close mechanism in an exhaust port from which heat is directed to the body part of the user due to the tilt state of the information equipment, as well as the open/close mechanism in an exhaust port in a portion where the hand of the user is in contact with or close to the information equipment, in a closed state.

In the present embodiment of the present invention, it is preferred that, in a case where a tilt angle at which the information equipment tilts with respect to a horizontal plane is a threshold value of more, the heat dissipation control part controls the open/closed state of the open/close mechanism so that heat exhausted from the exhaust ports is not directed to the user.

According to the above configuration, in the case where an angle at which the information equipment tilts with respect to the horizontal plane is a threshold value or more, the tilt state detecting part controls the open/closed state of the open/close mechanism so that heat exhausted from the exhaust ports is not directed to the user. More specifically, if the tilt angle is less than a threshold value, the heat dissipation control part does not control the open/closed state of the open/close mechanism. Thus, if the tilt angle is less than a threshold value, the heat dissipation control part can control the open/closed state of the open/close mechanism in accordance with the contact state or the closeness state without considering the tilt state. Consequently, a slight tilt of the information equipment at a tilt angle less than a threshold value or the like can be ignored.

In the embodiment of the present invention, it is preferred that the information equipment further includes: a body part; a hinge part connected to the body part; a display part that is rotatably supported by the body part via the hinge part; and a use mode detecting part that detects in which of at least two use modes the user is using the information equipment, in accordance with a rotation angle of the hinge part, wherein the heat dissipation control part controls the radiator or the open/closed state of the open/close mechanism so that heat exhausted from the exhaust ports is not directed to the hand of the user that is in contact with or close to the information equipment, in accordance with the use mode detected by the use mode detecting part.

According to the above configuration, the use mode detecting part detects in which of at least two use modes the user is using the information equipment, in accordance with the rotation angle of the hinge part. The heat dissipation control part controls the radiator or the open/closed state of the open/close mechanism so that heat exhausted from the exhaust ports is not directed to the hand of the user that is in contact with or close to the information equipment, in accordance with the use mode. Thus, the heat in the information equipment can be dissipated into the air through the exhaust ports without causing time and labor for the user and giving the user a disagreeable feeling.

Hereinafter, more specific embodiments of the present invention will be described in detail with reference to the drawings. Each figure, which will be referred to in the following, shows only main members required for describing the present invention among constituent members of one embodiment of the present invention in a simplified manner for convenience of description. Thus, the information equipment according to the present invention can include any constituent members not shown in each figure which is referred to in the present specification. Furthermore, the size and size ratio of the members in each figure do not exactly reflect those of actual constituent members.

Embodiment 1

FIG. 1 is a schematic view showing an external appearance of information equipment 1 according to the present embodiment. More specifically, the information equipment 1 according to the present embodiment includes a body part 2, a display part 3, and a touch panel 4. The information equipment 1 is equipment such as a laptop personal computer, a notebook personal computer, a tablet-type personal computer, a pocket personal computer, an HHT, a PDA, and a wearable computer. In the present embodiment, the information equipment 1 is assumed to be a tablet-type personal computer. Herein, although the information equipment 1 according to the present embodiment may be used on a desk, it is mostly used while being held by the user.

The body part 2 has properties such as shock resistance, water resistance, and noise resistance, and contains various electronic components to be heating elements, such as a CPU, a memory, and other components. Herein, a plurality of exhaust ports are provided on side surfaces of the body part 2. In the present embodiment, four exhaust ports 21a to 21d are provided respectively on four side surfaces of the body part 2. In FIG. 1, although four exhaust ports 21a to 21d are shown, at least two exhaust ports may be provided. The display part 3 is composed of a plate-type display element such as a liquid crystal panel and an electroluminescence (EL) panel. The touch panel 4 is provided on a display screen of the display part 3, and is composed of, for example, an analog resistive film touch panel, a capacitive touch panel, or an ultrasonic touch panel. In FIG. 1, open/close mechanisms 22a to 22d (described later) provided in the exhaust ports 21a to 21d are not shown.

Figure 2:
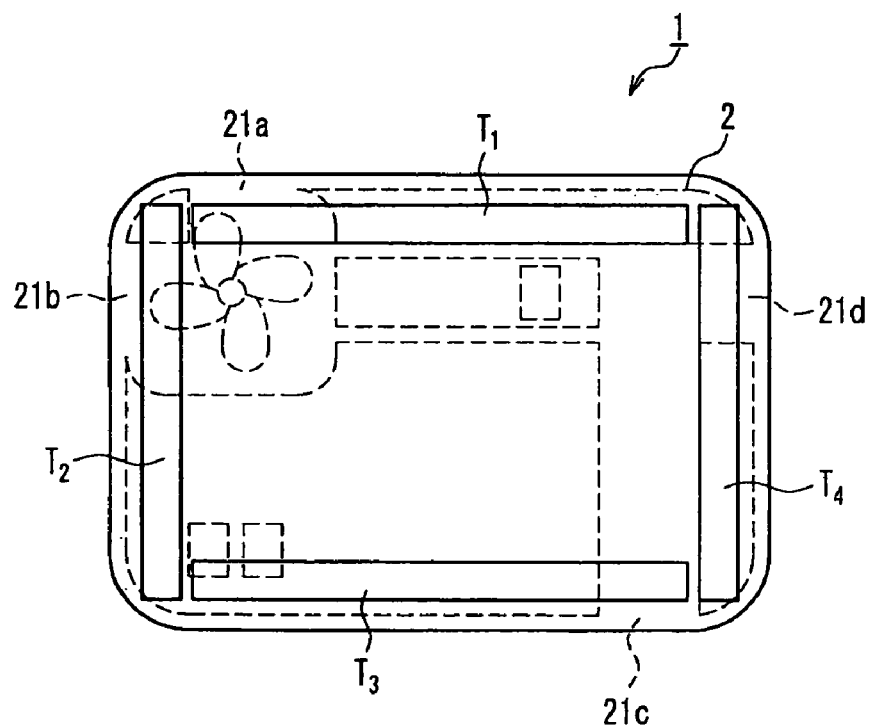
FIG. 2 is a schematic view seen from a back surface of the information equipment.

FIG. 2 is a schematic view of the body part 2 of the information equipment 1 according to the present embodiment seen from a back surface. More specifically, a plurality of sensors are provided in the vicinity of a plurality of the exhaust ports so as to correspond thereto. Specifically, four touch sensors $T_1$ to $T_4$ are provided in the vicinity of a plurality of the exhaust ports 21a to 21d and in an outer peripheral portion of the back surface of the body part 2. In the present embodiment, the touch sensor $T_1$ corresponds to the exhaust port 21a. The touch sensor $T_2$ corresponds to the exhaust port 21b. The touch sensor $T_3$ corresponds to the exhaust port 21c. The touch sensor $T_4$ corresponds to the exhaust port 21d. Herein, in the case where the hand of the user has come into contact with the touch sensors $T_1$ to $T_4$, the touch sensors $T_1$ to $T_4$ output logic signals "H" indicating that the hand of the user has come into contact with the touch sensors $T_1$ to $T_4$. Furthermore, in the case where the hand of the user is not in contact with the touch sensors $T_1$ to $T_4$, the touch sensors $T_1$ to $T_4$ output logic signals "L" indicating that the hand of the user is not in contact with the touch sensors $T_1$ to $T_4$.

In the above, although an example in which the touch sensors $T_1$ to $T_4$ are provided in an outer peripheral portion of the back surface of the body part 2 has been described, the present invention is not limited thereto. Specifically, the touch sensors $T_1$ to $T_4$ may be provided, for example, in an outer peripheral portion of a front surface of the display part 3, as long as they are provided in the vicinity of a plurality of the exhaust ports 21a to 21d. That is, the touch sensors $T_1$ to $T_4$ may be provided at any positions, as long as they are provided in the vicinity of a plurality of the exhaust ports 21a to 21c and can detect that the hand of the user is in contact with the information equipment 1. Furthermore, the size of the touch sensors $T_1$ to $T_4$ is not particularly limited, as long as the touch sensors $T_1$ to $T_4$ are provided in the vicinity of a plurality of the exhaust ports 21a to 21d.

Furthermore, whether or not the hand of the user is close to the information equipment 1 may be detected by providing an optical sensor such as an infrared sensor. Specifically, a plurality of optical sensors are provided in the vicinity of a plurality of the exhaust ports 21a to 21d so as to correspond thereto in the same way as in the touch sensors $T_1$ to $T_4$. Herein, in the case where the hand of the user is close to the optical sensor, the optical sensor outputs a logic signal "H" indicating that the hand of the user is close to the optical sensor. Furthermore, in the case where the hand of the user is not close to the optical sensor, the optical sensor outputs a logic signal "L" indicating that the hand of the user is not close to the optical sensor. Thus, whether or not the hand of the user is close to the information equipment 1 can be detected.

Furthermore, touch sensors and optical sensors may be provided in the information equipment 1. By providing the touch sensors and the optical sensors in the information equipment 1, both whether or not the hand of the user is in contact with the information equipment 1 and whether or not the hand of the user is close to the information equipment 1 can be detected.

Figure 3:
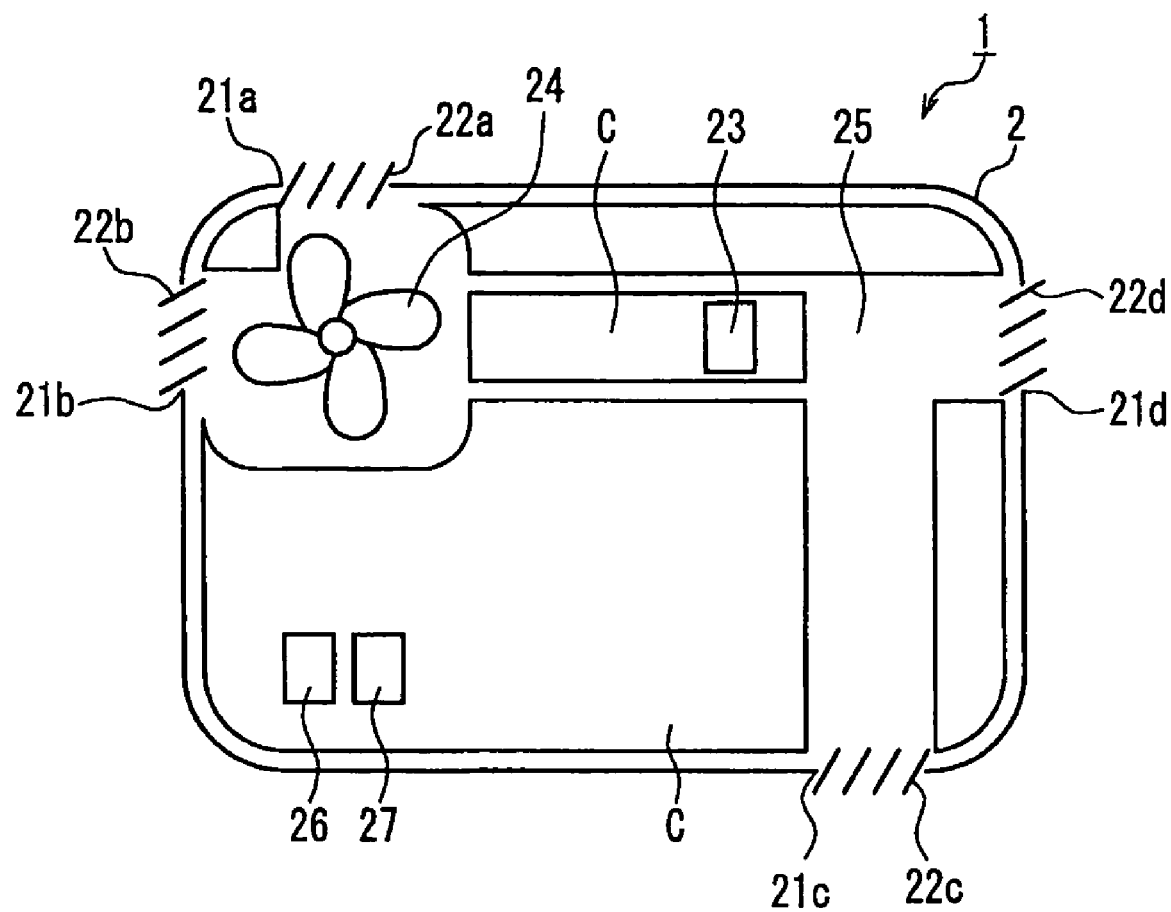
FIG. 3 is a schematic view showing an internal configuration of a body part seen from above in the case where the body part is cut along a plane composed of a line A-A' and a line B-B' shown in FIG. 1.

FIG. 3 is a schematic view showing an internal configuration of the body part 2 seen from above in the case where the body part 2 is cut along a plane composed of a line A-A' and a line B-B' shown in FIG. 1. More specifically, four exhaust ports 21a to 21d are provided respectively on four side surfaces of the body part 2. Furthermore, the exhaust ports 21a to 21d are provided with open/close mechanisms 22a to 22d for opening/closing the exhaust ports 21a to 21d. In the present embodiment, the open/close mechanisms 22a to 22d have a blind structure. In FIG. 3, the open/close mechanisms 22a to 22d are in an opened state (open state). The open/close mechanisms 22a to 22d are not limited to a blind structure, and for example, may have a structure such as a shutter of a camera. More specifically, in the case where the open/close mechanisms 22a to 22d are in an open state, the heat in the body part 2 is dissipated into the air through the exhaust ports 21a to 21d. The open/closed states of the open/close mechanisms 22a to 22d are switched individually by a heat dissipation control part 27 described later.

Furthermore, on a substrate C in the body part 2, a CPU 23 is provided. The CPU 23 performs complicated operation processing in a short period of time, so that the CPU 23 becomes heated with the passage of time. That is, the CPU 23 generates heat. Therefore, a cooling fan 24 is provided in the body part 2. The cooling fan (radiator) 24 dissipates the heat generated by the CPU 23 into the air through the exhaust ports 21a to 21d via an exhaust path 25. Consequently, the CPU 23 is cooled and can continue to be operated normally without causing inconvenience by high heat. In FIG. 3, although one cooling fan 24 is shown, any number of cooling fans can be used. Furthermore, the radiator may be a Peltier element or the like instead of the cooling fan 24.

Furthermore, a user state detecting part 26 and the heat dissipation control part 27 are provided on the substrate C in the body part 2. The user state detecting part 26 detects a contact state in which the hand of the user is in contact with the information equipment 1 in accordance with the logic signals output from the touch sensors $T_1$ to $T_4$. In the case where optical sensors are provided in the information equipment 1, the user state detecting part 26 detects a closeness state in which the hand of the user is close to the information equipment 1 in accordance with the logic signal output from the optical sensor. Herein, the user state detecting part 26 has a user state detection table 26a. FIG. 4 shows an example of data recorded in the user state detection table 26a according to the present embodiment. As shown in FIG. 4, in the user state detection table 26a, six patterns of a combination of a logic signal of the touch sensor $T_1$, a logic signal of the touch sensor $T_2$, a logic signal of the touch sensor $T_3$, a logic signal of the touch sensor $T_4$, and a state signal are recorded.

Specifically, the user state detecting part 26 compares the logic signals output from the touch sensors $T_1$ to $T_4$ with the patterns of Cases 1 to 6 recorded in the user state detection table 26a, thereby detecting the contact state in which the hand of the user is in contact with the information equipment 1. In the present embodiment, the user state detecting part 26 also considers a pattern that ORs the patterns of Cases 1 to 4, in addition to the patterns of Cases 1 to 4. Thus, only minimum patterns may be recorded in the user state detection table 26a, so that the storage capacity of the user state detection table 26a can be suppressed. The user state detecting part 26 detects the pattern that ORs all the patterns of Cases 1 to 4 (i.e., all the logic signals of the touch sensors $T_1$ to $T_4$ are "H") as the pattern of Case 5.

Herein, for example, in the case where the logic signal of the touch sensor $T_1$ is "L", the logic signal of the touch sensor $T_2$ is "H", the logic signal of the touch sensor $T_3$ is "L", and the logic signal of the touch sensor $T_4$ is "L", although the hand of the user is in contact with the touch sensor $T_2$ provided in an outer peripheral portion of the back surface of the body part 2, the hand of the user is not in contact with the touch sensors $T_1$, $T_3$, and $T_4$. Therefore, the user state detecting part 26 extracts the state signal "Case 2" indicating that the hand of the user is in contact with the touch sensor $T_2$ from the user state detection table 26a. Furthermore, for example, in the case where the logic signal of the touch sensor $T_1$ is "L", the logic signal of the touch sensor $T_2$ is "H", the logic signal of the touch sensor $T_3$ is "H", and the logic signal of the touch sensor $T_4$ is "L", although the hand of the user is in contact with the touch sensors $T_2$, $T_3$ provided in an outer peripheral portion of the back surface of the body part 2, the hand of the user is not in contact with the touch sensors $T_1$, $T_4$. Therefore, the user state detecting part 26 extracts the state signals "Case 2" and "Case 3" indicating that the hand of the user is in contact with the touch sensors $T_2$, $T_3$ from the user state detection table 26a. The user state detecting part 26 outputs the extracted state signals to the heat dissipation control part 27.

The heat dissipation control part 27 controls an open/close mechanism provided in an exhaust port corresponding to the touch sensor with which the user of the information equipment 1 is in contact so that the open/close mechanism is placed in a closed state. Specifically, the heat dissipation control part 27 controls the open/closed states of the open/close mechanisms 22a to 22d provided in the exhaust ports 21a to 21d individually so that the heat exhausted from the exhaust ports 21a to 21d is not directed to the hand of the user that is in contact with the information equipment 1, in accordance with the state signal output from the user state detecting part 26. Therefore, the heat dissipation control part 27 has a heat dissipation control table 27a. FIG. 5 shows an example of data recorded in the heat dissipation control table 27a according to the present embodiment. As shown in FIG. 5, in the heat dissipation control table 27a, six patterns of a combination of a state signal, a control signal of the open/close mechanism 22a, a control signal of the open/close mechanism 22b, a control signal of the open/close mechanism 22c, and a control signal of the open/close mechanism 22d are recorded. The control signal is represented by "Open" indicating that the open/close mechanisms 22a to 22d are in an open state, and "Close" indicating that the open/close mechanisms 22a to 22d are in a closed state. Furthermore, in the present embodiment, it is assumed that "Close" is "1", and "Open" is "0".

Specifically, the heat dissipation control part 27 compares the state signal output from the user state detecting part 26 with the state signals recorded in the heat dissipation control table 27a, thereby controlling the open/closed states of the open/close mechanisms 22a to 22d provided in the exhaust ports 21a to 21d.

Herein, for example, in the case where the state signal output from the user state detecting part 26 is "Case 2", the heat dissipation control part 27 extracts a control signal "Open" of the open/close mechanism 22a, a control signal "Close" of the open/close mechanism 22b, a control signal "Open" of the open/close mechanism 22c, and a control signal "Open" of the open/close mechanism 22d from the heat dissipation control table 27a. The heat dissipation control part 27 outputs the control signal indicating "Close" to the open/close mechanism 22b. Furthermore, the heat dissipation control part 27 outputs the control signals indicating "Open" to the open/close mechanisms 22a, 22c, and 22d, respectively.

Furthermore, for example, in the case where the state signals output from the user state detecting part 26 are "Case 2" and "Case 3", the heat dissipation control part 27 performs the following processing. Specifically, first, the heat dissipation control part 27 extracts control signals corresponding to "Case 2", i.e., a control signal "Open" of the open/close mechanism 22a, a control signal "Close" of the open/close mechanism 22b, a control signal "Open" of the open/close mechanism 22c, and a control signal "Open" of the open/close mechanism 22d from the heat dissipation control table 27a. Furthermore, the heat dissipation control part 27 extracts control signals corresponding to "Case 3", i.e., a control signal "Open" of the open/close mechanism 22a, a control signal "Open" of the open/close mechanism 22b, a control signal "Close" of the open/close mechanism 22c, and a control signal "Open" of the open/close mechanism 22d from the heat dissipation control table 27a. Then, the heat dissipation control part 27 ORs the extracted control signals corresponding to "Case 2" and the extracted control signals corresponding to "Case 3". Thus, the control signal "Open" of the open/close mechanism 22a, the control signal "Close" of the open/close mechanism 22b, the control signal "Close" of the open/close mechanism 22c, and the control signal "Open" of the open/close mechanisms 22d are calculated. Then, the heat dissipation control part 27 outputs the control signals indicating "Open" to the open/close mechanisms 22b, 22c, respectively. Furthermore, the heat dissipation control part 27 outputs the control signals indicating "Close" to the open/close mechanisms 22a, 22d.

Figure 6:
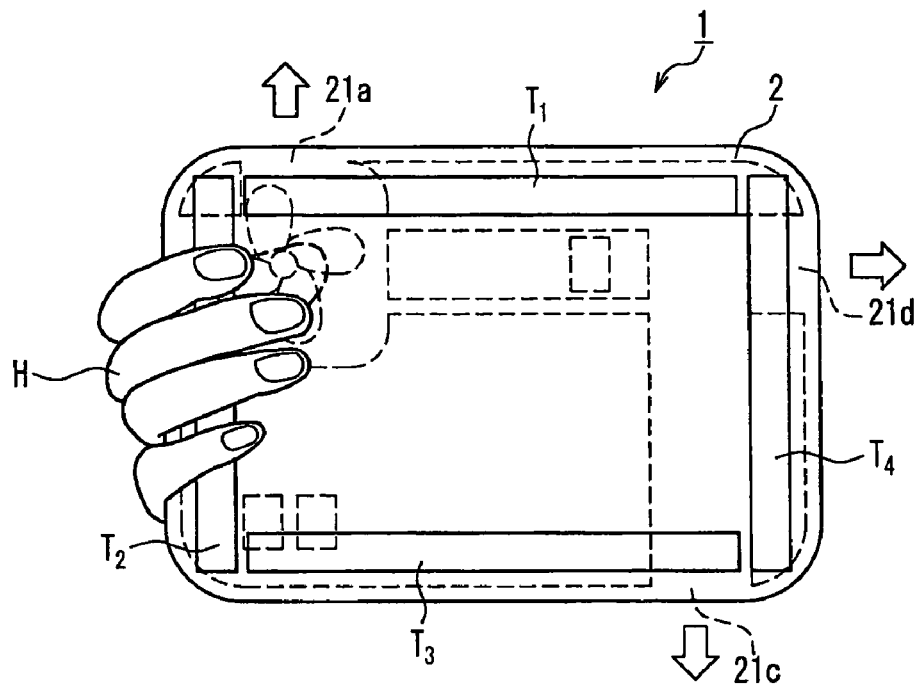
FIG. 6 is a conceptual view showing an example of a state in which the user is holding the information equipment.
Figure 7:
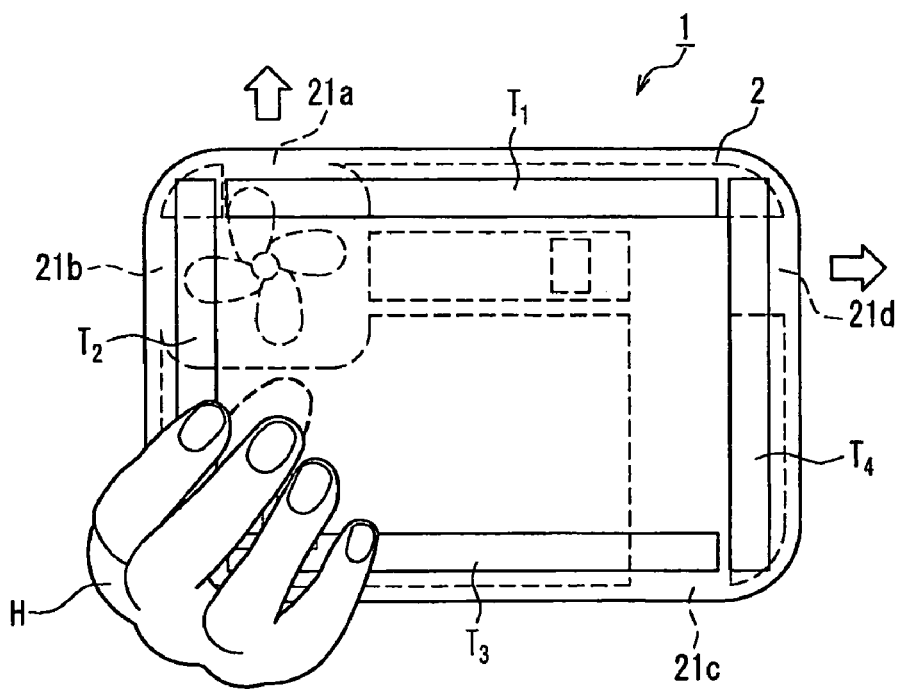
FIG. 7 is a conceptual view showing another example of a state in which the user is holding the information equipment.

The open/close mechanisms 22a to 22d switch the open/closed states in accordance with the control signal output from the heat dissipation control part 27. Herein, for example, in the case where the state signal is "Case 2", i.e., in the case where the user is holding the information equipment 1 with a hand H in a state as shown in FIG. 6 (in the case where the hand H of the user is in contact with the touch sensor $T_2$), the open/close mechanism 22b is placed in a closed state and the open/close mechanisms 22a, 22c, and 22d are placed in an open state. Thus, the heat in the body part 2 is dissipated into the air through the exhaust ports 21a, 21c, and 21d. Consequently, the heat exhausted from the exhaust port 21b is not directed to the hand H of the user holding the information equipment 1. Furthermore, for example, in the case where the state signals are "Case 2" and "Case 3", i.e., in the case where the user is holding the information equipment 1 with the hand H (in the case where the hand H of the user is in contact with the touch sensors $T_2$, $T_3$) in a state as shown in FIG. 7, the open/close mechanisms 22b, 22c are placed in a closed state, and the open/close mechanisms 22a, 22d are placed in an open state. Thus, the heat in the body part 2 is dissipated into the air through the exhaust ports 21a, 21d. Consequently, the heat exhausted from the exhaust ports 21b, 21c is not directed to the hand H of the user holding the information equipment 1. Arrows shown in FIGS. 6 and 7 indicate the directions of the heat exhausted from exhaust ports.

The configuration of the information equipment 1 has been described above. However, the configuration of the information equipment 1 is not limited to that shown in FIGS. 1 to 3. For example, temperature sensors may be provided inside and outside of the body part 2, respectively. Specifically, the temperature sensor provided inside the body part 2 and the temperature sensor provided outside the body part 2 are connected to the CPU 23, respectively. The temperature sensor provided inside the body part 2 measures the temperature inside the body part 2. The temperature sensor provided outside the body part 2 measures the temperature outside the body part 2. The CPU 23 calculates a temperature difference between the temperature inside the body part 2 and the temperature outside the body part 2, based on the temperature information output from the respective temperature sensors. When the temperature difference between the temperature inside the body part 2 and the temperature outside the body part 2 reaches a predetermined value or more, the CPU 23 instructs the heat dissipation control part 27 to place all the open/close mechanisms 22a to 22d in an open state irrespective of the state signal output from the user state detecting part 26. The heat dissipation control part 27 outputs control signals indicating "Open" to all the open/close mechanisms 22a to 22d, respectively, in accordance with the instruction from the CPU 23. Consequently, all the open/close mechanisms 22a to 22d are placed in an open state. More specifically, in the case where the temperature difference between the temperature inside the body part 2 and the temperature outside the body part 2 reaches a predetermined value or more, the heat inside the body part 2 can be dissipated into the air through the exhaust ports 21a to 21d forcefully.

Furthermore, for example, the information equipment 1 may use a load measuring function of an operating system (OS) of the body part 2. Specifically, the load measuring function of the OS of the body part 2 measures a load generated in the CPU 23. When the load measured by the load measuring function reaches a threshold value or more, the CPU 23 instructs the heat dissipation control part 27 to place all the open/close mechanisms 22a to 22d in an open state irrespective of the state signal output from the user state detecting part 26. The heat dissipation control part 27 outputs control signals indicating "Open" to all the open/close mechanisms 22a to 22d in accordance with the instruction from the CPU 23. Consequently, all the open/close mechanisms 22a to 22d are placed in an open state. More specifically, in the case where the load generated in the CPU 23 reaches a threshold value or more, the heat inside the body part 2 can be dissipated into the air through the exhaust ports 21a to 21d forcefully.

Next, the operation of the information equipment 1 according to the above configuration will be described with reference to FIG. 8.

Figure 8:
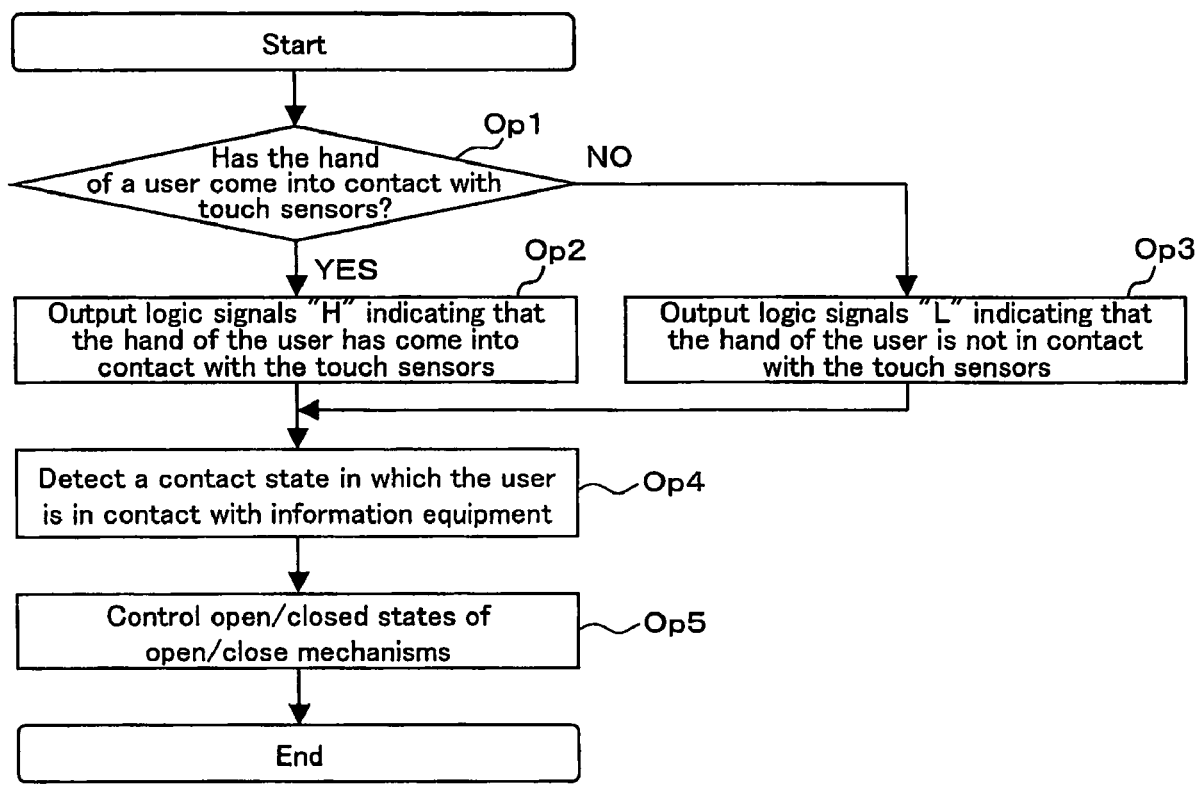
FIG. 8 is a flowchart illustrating an example of an operation of the information equipment.

FIG. 8 is a flowchart illustrating an example of the operation of the information equipment 1. As shown in FIG. 8, the touch sensors $T_1$ to $T_4$ detect whether or not the hand of the user has come into contact with the touch sensors $T_1$ to $T_4$ (Op1). When the touch sensors $T_1$ to $T_4$ detect that the hand of the user has come into contact with the touch sensors $T_1$ to $T_4$ (YES in Op1), the touch sensors $T_1$ to $T_4$ output logic signals "H" indicating that the hand of the user has come into contact with the touch sensors $T_1$ to $T_4$ (Op2). On the other hand, when the touch sensors $T_1$ to $T_4$ detect that the hand of the user is not in contact with the touch sensors $T_1$ to $T_4$ (NO in Op1), the touch sensors $T_1$ to $T_4$ output logic signals "L" indicating that the hand of the user is not in contact with the touch sensors $T_1$ to $T_4$ (Op3).

Then, the user state detecting part 26 compares the logic signals output in Op2 and Op3 with the patterns of Cases 1 to 6 recorded in the user state detection table 26a, thereby detecting a contact state (state signal) in which the hand of the user is in contact with the information equipment 1 (Op4).

Then, the heat dissipation control part 27 controls the open/closed states of the open/close mechanisms 22a to 22d provided in the exhaust ports 21a to 21d individually so that the heat exhausted from the exhaust ports 21a to 21d is not directed to the hand of the user that is in contact with the information equipment 1, in accordance with the state signal detected in Op4 (Op5).

As described above, according to the information equipment 1 of the present embodiment, the user state detecting part 26 detects a contact state in which the hand of the user is in contact with the information equipment 1, or a closeness state in which the hand of the user is close to the information equipment 1. The heat dissipation control part 27 controls the open/closed states of the open/close mechanisms 22a to 22d so that the heat exhausted from the exhaust ports 21a to 21d is not directed to the hand of the user that is in contact with or close to the information equipment 1, in accordance with the contact state or the closeness state. Consequently, the heat in the information equipment 1 can be dissipated into the air through the exhaust ports 21a to 21d without causing time and trouble for the user and without giving the user a disagreeable feeling.

Embodiment 2

Figure 9:
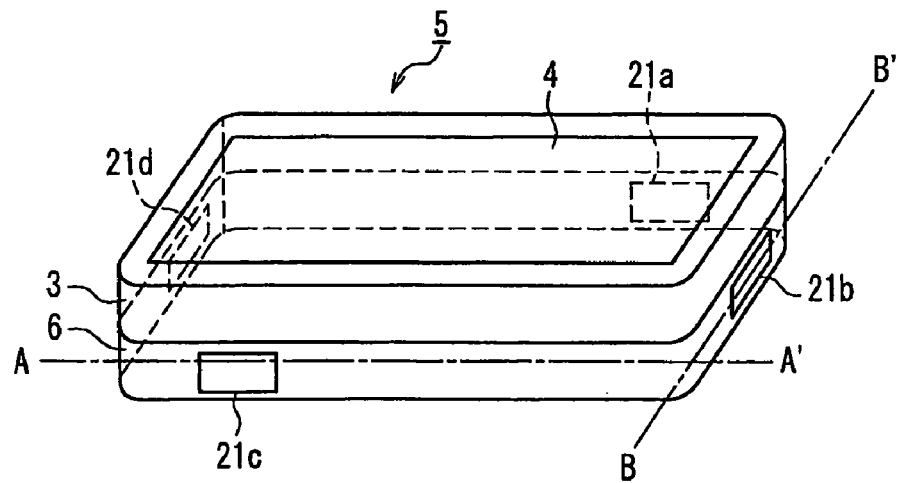
FIG. 9 is a schematic view showing an external appearance of information equipment according to Embodiment 2 of the present invention.

FIG. 9 is a schematic view showing an external appearance of an information equipment 5 according to the present embodiment. More specifically, the information equipment 5 according to the present embodiment includes a body part 6 instead of the body part 2 shown in FIG. 1. In FIG. 9, the components having the same functions as those in FIG. 1 are denoted with the same reference numerals as those therein, and the detailed description thereof will be omitted.

In the present embodiment, the information equipment 5 also is assumed to be a tablet-type personal computer. Therefore, although the information equipment 5 according to the present embodiment may be used on a desk, it is mostly used while being held by the user, in the same way as in the information equipment 1 shown in FIG. 1.

Figure 10:
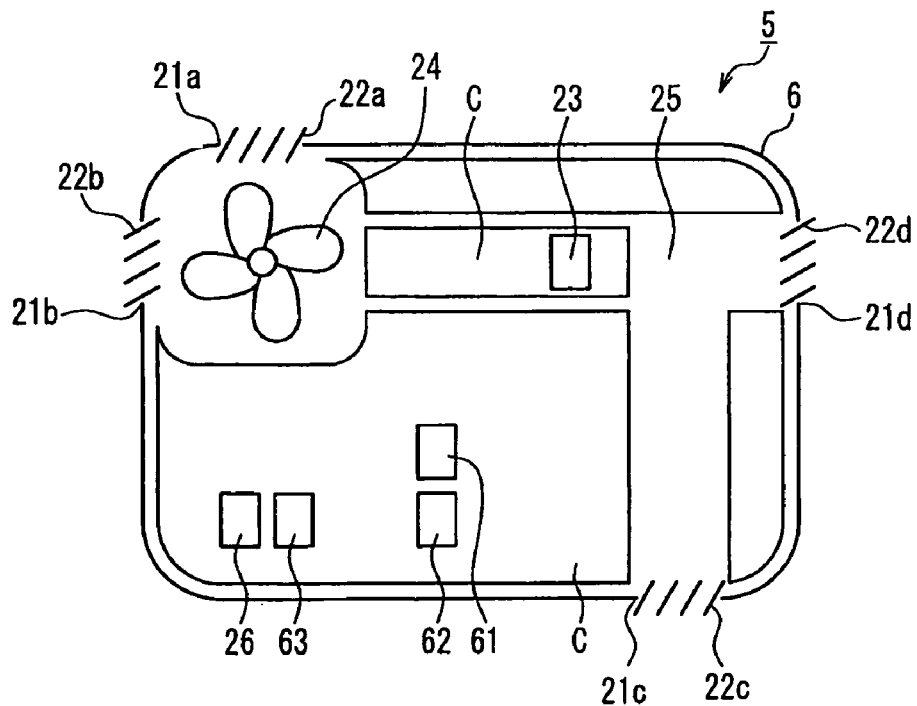
FIG. 10 is a schematic view showing an internal configuration of a body part seen from above in the case where the body part is cut along a plane composed of a line A-A' and a line B-B' shown in FIG. 9.

FIG. 10 is a schematic view showing an internal configuration of the body part 6 seen from above, in the case where the body part 6 is cut along a plane composed of a line A-A' and a line B-B' shown in FIG. 9. More specifically, a tilt sensor 61 and a tilt state detecting part 62 are provided on the substrate C in the body part 6. Furthermore, a heat dissipation control part 63 is provided instead of the heat dissipation control part 27 shown in FIG. 3 on the substrate C in the body part 6.

Figure 11A:
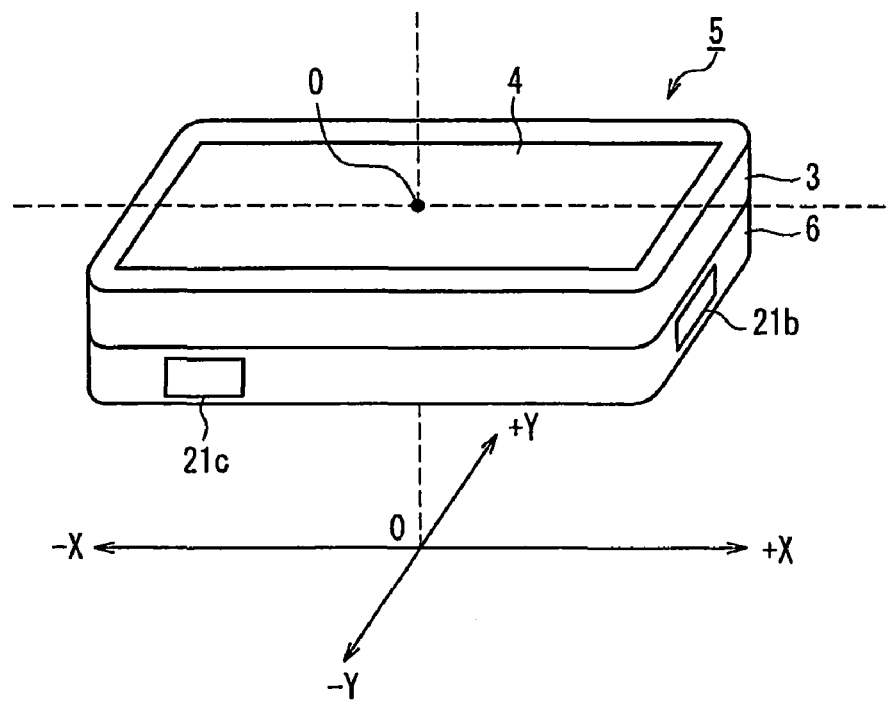
FIGS. 11A and 11B respectively illustrate a tilt direction of the information equipment.
Figure 11B:
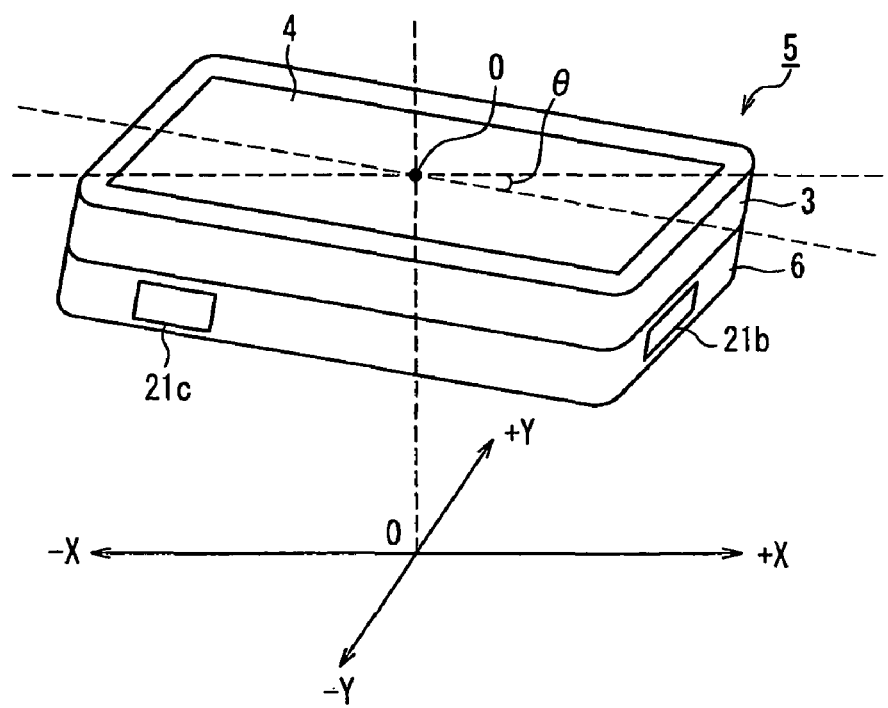

The tilt sensor 61 detects a tilt direction in which the information equipment 5 tilts with respect to a horizontal plane, and outputs the detected tilt direction. FIGS. 11A and 11B are views illustrating the tilt direction of the information equipment 5. As shown in FIG. 11A, if the information equipment 5 is positioned in parallel to a horizontal plane (XY plane), the tilt sensor 61 detects a tilt direction "0" (horizontal) of the information equipment 5. Furthermore, as shown in FIG. 11B, if the information equipment 5 tilts so that a portion in a +X direction is lower than a portion in a –X direction, the tilt sensor 61 detects a tilt direction "+X" indicating that the information equipment 5 tilts in the +X direction with respect to the horizontal plane. Similarly, although not shown, if the information equipment 5 tilts so that the portion in the –X direction is lower than the portion in the +X direction, the tilt sensor 61 detects the tilt direction "–X" indicating that the information equipment 5 tilts in the –X direction with respect to the horizontal plane. Furthermore, if the information equipment 5 tilts so that a portion in a +Y direction is lower than a portion in a –Y direction, the tilt sensor 61 detects the tilt direction "+Y" indicating that the information equipment 5 tilts in the +Y direction with respect to the horizontal plane. Furthermore, if the information equipment 5 tilts so that the portion in the –Y direction is lower than the portion in the +Y direction, the tilt sensor 61 detects a tilt direction "–Y" indicating that the information equipment 5 tilts in the –Y direction with respect to the horizontal plane. In the present embodiment, although an example in which the tilt sensor 61 detects four tilt directions "+X", "–X", "+Y", and "–Y" has been described, the present invention is not limited thereto. More specifically, the tilt sensor 61 may detect any tilt direction.

The tilt state detecting part 62 detects the tilt state of the information equipment 5 in accordance with the tilt direction output from the tilt sensor 61. Therefore, the tilt state detecting part 62 has a tilt state detection table 62a. FIG. 12 is a diagram showing an example of data recorded in the tilt state detection table 62a according to the present embodiment. As shown in FIG. 12, four patterns of a combination of a tilt direction and a state signal are recorded in the tilt state detection table 62a. More specifically, the tilt state detecting part 62 compares the tilt direction output from the tilt sensor 61 with the patterns of Cases 7 to 10 recorded in the tilt state detection table 62a, thereby detecting the tilt state (state signal) of the information equipment 5. The tilt state detecting part 62 outputs the detected state signal to the heat dissipation control part 63.

The heat dissipation control part 63 controls an open/close mechanism provided in an exhaust port in a tilt direction in which the information equipment 5 tilts with respect to the horizontal plane so that the open/close mechanism is placed in a closed state. Specifically, the heat dissipation control part 63 controls the open/closed states of the open/close mechanisms 22a to 22d provided in the exhaust ports 21a to 21d individually, in accordance with the state signal output from the user state detecting part 26 and the state signal output from the tilt state detecting part 62. More specifically, the heat dissipation control part 63 controls the open/closed states of the open/close mechanisms 22a to 22d individually so that the heat exhausted from the exhaust ports 21a to 21d is not directed to the hand of the user that is in contact with the information equipment 5 and so that the heat exhausted from the exhaust ports 21a to 21d is not directed to the user holding the information equipment 5. Therefore, the heat dissipation control part 63 has a heat dissipation control table 63a. FIG. 13 is a diagram showing an example of data recorded in the heat dissipation control table 63a according to the present embodiment. As shown in FIG. 13, ten patterns of a combination of a state signal, a control signal of the open/close mechanism 22a, a control signal of the open/close mechanism 22b, a control signal of the open/close mechanism 22c, and a control signal of the open/close mechanism 22d are recorded. In the present embodiment, "Close" and "Open" are also assumed to be "1" and "0", respectively.

Specifically, the heat dissipation control part 63 compares the state signal output from the user state detecting part 26 with the state signals recorded in the heat dissipation control table 63a. Furthermore, the heat dissipation control part 63 compares the state signal output from the tilt state detecting part 62 with the state signals recorded in the heat dissipation control table 63a. As a result of the comparison, the heat dissipation control part 63 controls the open/closed states of the open/close mechanisms 22a to 22d individually.

Herein, for example, the case where the state signal output from the user state detecting part 26 is "Case 2", and the state signal output from the tilt state detecting part 62 is "Case 9" will be considered. The heat dissipation control part 63 first extracts the control signals corresponding to "Case 2", i.e., a control signal "Open" of the open/close mechanism 22a, a control signal "Close" of the open/close mechanism 22b, a control signal "Open" of the open/close mechanism 22c, and a control signal "Open" of the open/close mechanism 22d from the heat dissipation control table 63a. Furthermore, the heat dissipation control part 63 extracts the control signals corresponding to "Case 9", i.e., a control signal "Open" of the open/close mechanism 22a, a control signal "Open" of the open/close mechanism 22b, a control signal "Close" of the open/close mechanism 22c, and a control signal "Open" of the open/close mechanism 22d from the heat dissipation control table 63a. The heat dissipation control part 63 ORs the extracted control signals corresponding to "Case 2" and the extracted control signals corresponding to "Case 9". Consequently, the control signal "Open" of the open/close mechanism 22a, the control signal "Close" of the open/close mechanism 22b, the control signal "Close" of the open/close mechanism 22c, and the control signal "Open" of the open/close mechanism are calculated. Then, the heat dissipation control part 63 outputs the control signals indicating "Open" to the open/close mechanisms 22a, 22d, respectively. Furthermore, the heat dissipation control part 63 outputs the control signals indicating "Close" to the open/close mechanisms 22b, 22c, respectively.

The heat dissipation control part 63 has a function of invalidating either of the logic signals of "Case 7" and "Case 8" and the logic signals of "Case 9" and "Case 10", if the state signal output from the user-state detecting part 26 indicates "Case 7", "Case 8", "Case 9", and "Case 10". Thus, all the open/close mechanisms 22a to 22d are not placed in a closed state, so that the heat in the body part 2 can be dissipated into the air exactly from either of the exhaust ports 21a to 21d.

Furthermore, the heat dissipation control part 63 may be further provided with the following function by providing the tilt sensor 61 with a function of detecting a tilt angle at which the information equipment 5 tilts with respect to the horizontal plane. The tilt angle is represented by θ shown in FIG. 11B. More specifically, the heat dissipation control part 63 controls the open/closed states of the open/close mechanisms 22a to 22d individually so that the heat exhausted from the exhaust ports 21a to 21d is not directed to the user holding the information equipment 5 when the tilt angle output from the tilt sensor 61 is a threshold value or more. Specifically, the heat dissipation control part 63 first determines whether or not the tilt angle output from the tilt sensor 61 is a threshold value or more. The threshold value is previously recorded in a memory (not shown) of the heat dissipation control part 63. In the present embodiment, although the threshold value is determined uniformly irrespective of X and Y directions that are tilt directions, for example, the threshold value may be determined for each of the X and Y directions that are tilt directions. If the tilt angle is a threshold value or more, the heat dissipation control part 63 controls the open/closed states of the open/close mechanisms 22a to 22d individually so that the heat exhausted from the exhaust ports 21a to 21d is not directed to the user holding the information equipment 5. On the other hand, if the tilt angle is less than a threshold value, the heat dissipation control part 63 does not control the open/closed states of the open/close mechanisms 22a to 22d. Thus, a slight tilt of the information equipment 5 at a tilt angle less than a threshold value or the like can be ignored.

Figure 14:
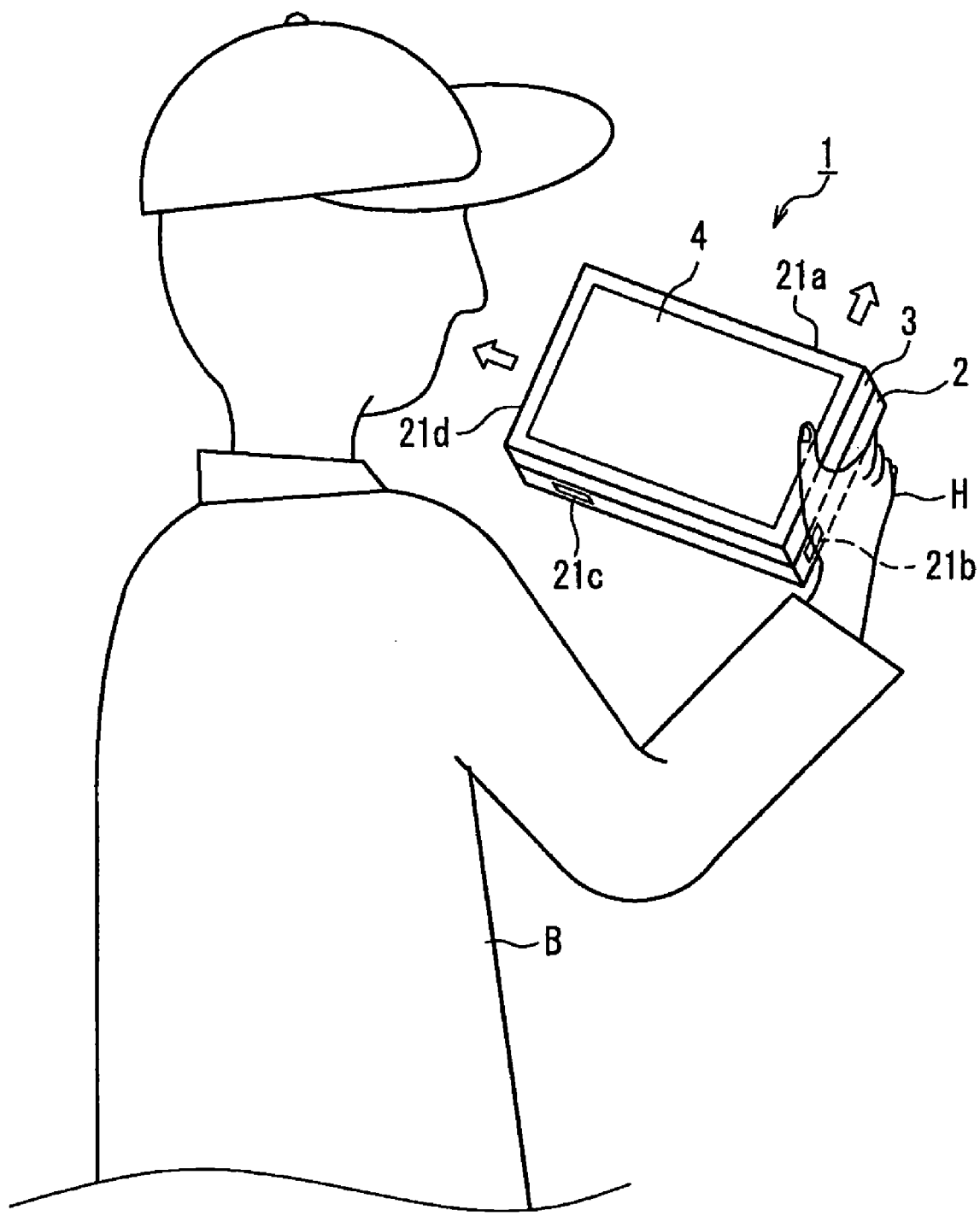
FIG. 14 is a conceptual view showing an example of a state in which a user is holding the information equipment.

The open/close mechanisms 22a to 22d switch the open/closed states in accordance with the control signal output from the heat dissipation control part 63. Herein, for example, in the case where the state signals are "Case 2" and "Case 9", more specifically, in the case where the user holds the information equipment 5 with the hand H in a state as shown in FIG. 14 (in the case where the hand H of the user is in contact with the touch sensor $T_2$, and the information equipment 5 tilts in the −Y direction), the open/close mechanisms 22b, 22c are placed in a closed state, and the open/close mechanisms 22a, 22d are placed in an open state. Thus, the heat in the body part 6 is dissipated into the air through the exhaust ports 21a, 21d. Consequently, the heat exhausted from the exhaust ports 21c, 21d is not directed to the hand H of the user that is in contact with the information equipment 5 and a body part B of a user U holding the information equipment 5.

Figure 15:
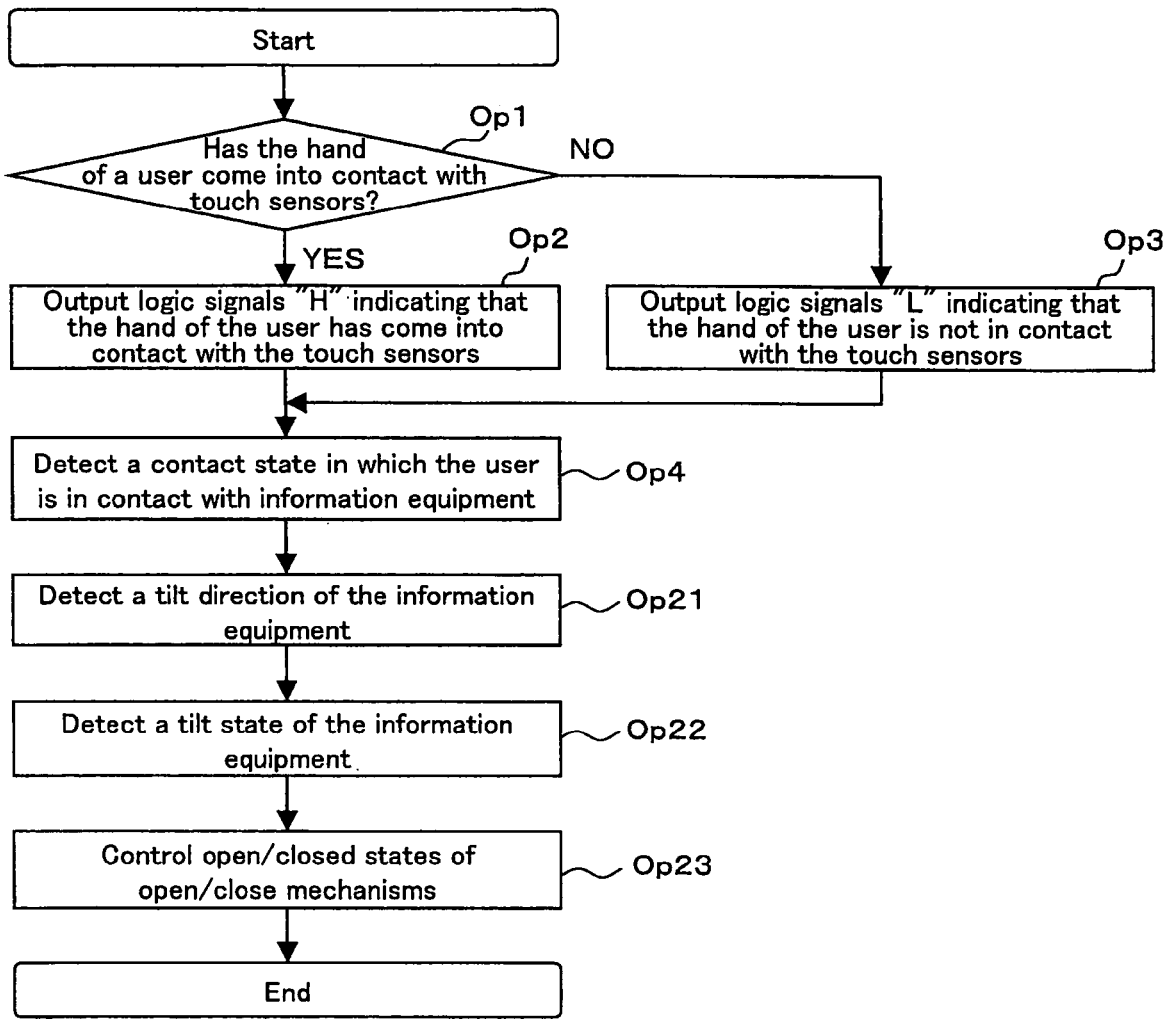
FIG. 15 is a flowchart illustrating an example of an operation of the information equipment.

Next, an operation of the information equipment 5 according to the above configuration will be described with reference to FIG. 15. In FIG. 15, portions indicating the same processings as those in FIG. 8 are denoted with the same reference numerals as those therein, and the detailed description thereof will be omitted.

FIG. 15 is a flowchart illustrating an example of the operation of the information equipment 5. As shown in FIG. 15, after Op5, the tilt sensor 61 detects a tilt direction in which the information equipment 5 tilts with respect to the horizontal plane (Op21). Then, the tilt state detecting part 62 detects a tilt state of the information equipment 5 in accordance with the tilt direction detected in Op21 (Op22).

The heat dissipation control part 63 controls the open/closed states of the open/close mechanisms 22a to 22d individually so that the heat exhausted from the exhaust ports 21a to 21d is not directed to the hand of the user that is in contact with the information equipment 5 and the heat exhausted from the exhaust ports 21a to 21d is not directed to the body part of the user holding the information equipment 5 (Op23). More specifically, if the tilt state of the information equipment 5 has been detected in Op23, the heat dissipation control part 63 controls the open/closed states of the open/close mechanisms 22a to 22d individually in accordance with the state signal detected in Op5 and the state signal detected in Op22. On the other hand, if the tilt state of the information equipment 5 has not been detected in Op23, the heat dissipation control part 63 controls the open/closed states of the open/close mechanisms 22a to 22d in accordance with the state signal detected in Op5.

In FIG. 15, although the processings in Op1 to Op5 and the processings in Op21 to Op23 are performed in series, the processings in Op1 to Op5 and the processings in Op21 to Op23 may be performed in parallel.

As described above, in the information equipment 5 according to the present embodiment, the tilt state detecting part 62 detects a tilt state indicating the direction in which the information equipment 5 tilts with respect to the horizontal plane. The heat dissipation control part 63 controls the open/closed states of the open/close mechanisms 22a to 22d so that the heat exhausted from the exhaust ports 21a to 21d is not directed to the user holding the information equipment 5 in accordance with the detected tilt state. Thus, the heat dissipation control part 63 can control the open/closed states of the open/close mechanisms 22a to 22d, considering the tilt state as well as the contact state or the closeness state. Consequently, the heat dissipation control part 63 can place the open/close mechanism in an exhaust port from which heat is directed to the body part of the user due to the tilt state of the information equipment 5, as well as the open/close mechanism in an exhaust port in a portion where the hand of the user is in contact with or close to the information equipment 5, in a closed state.

Embodiment 3

Figure 16A:
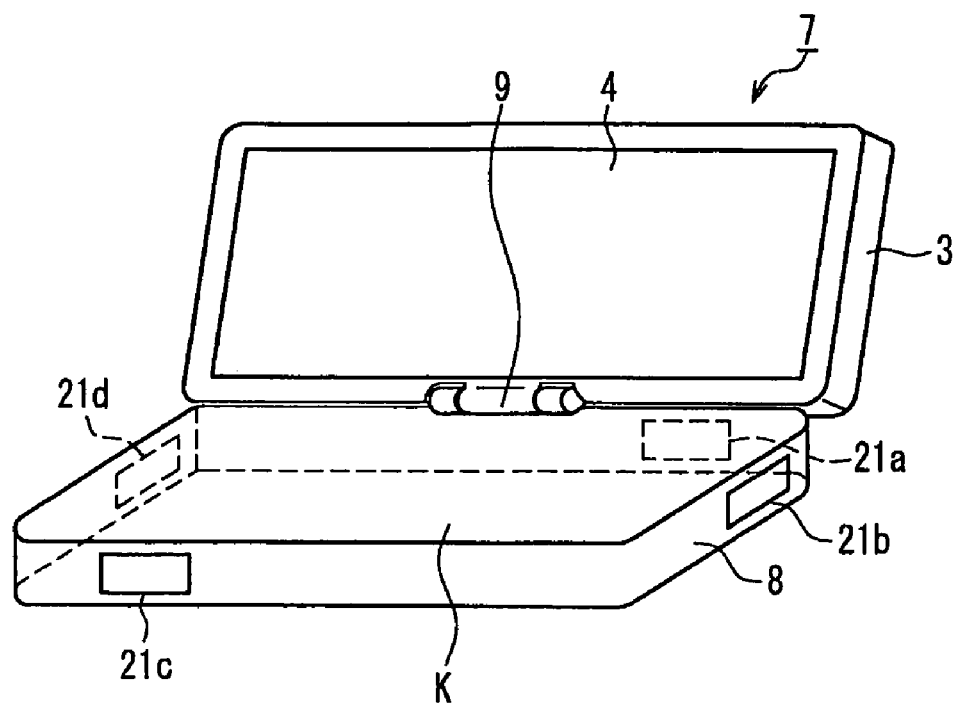
FIGS. 16A and 16B are schematic views respectively showing external appearances of information equipment according to Embodiment 3 of the present invention.
Figure 16B:
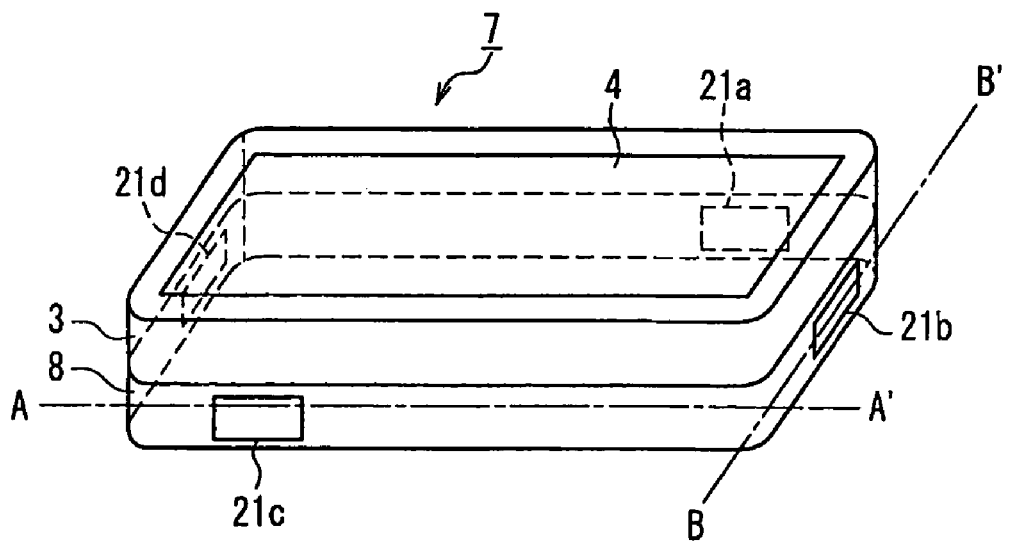

FIGS. 16A and 16B are schematic views showing an outer appearance of information equipment 7 according to the present embodiment. More specifically, the information equipment 7 according to the present embodiment includes a body part 8 instead of the body part 6 shown in FIG. 9. Furthermore, the information equipment 7 according to the present embodiment includes a hinge part 9 in addition to the information equipment 5 shown in FIG. 9. In the present embodiment, a display part 3 is rotatably supported by the body part 8 via the hinge part 9. Therefore, the user of the information equipment 7 can select a use mode (hereinafter, referred to as a "notebook PC mode") in which the display part 3 is opened at an arbitrary angle with respect to the body part 8 as shown in FIG. 16A and a use mode (hereinafter, referred to as a "tablet mode") in which the display part 3 is folded so as to overlap the body part 8 as shown in FIG. 16B. Furthermore, in the notebook PC mode, a keyboard part K composed of a plurality of input keys is provided in an upper portion of the body part 8. In FIGS. 16A and 16B, the components having the same functions as those in FIG. 9 are denoted with the same reference numerals as those therein, and the detailed description thereof will be omitted.

Figure 17:
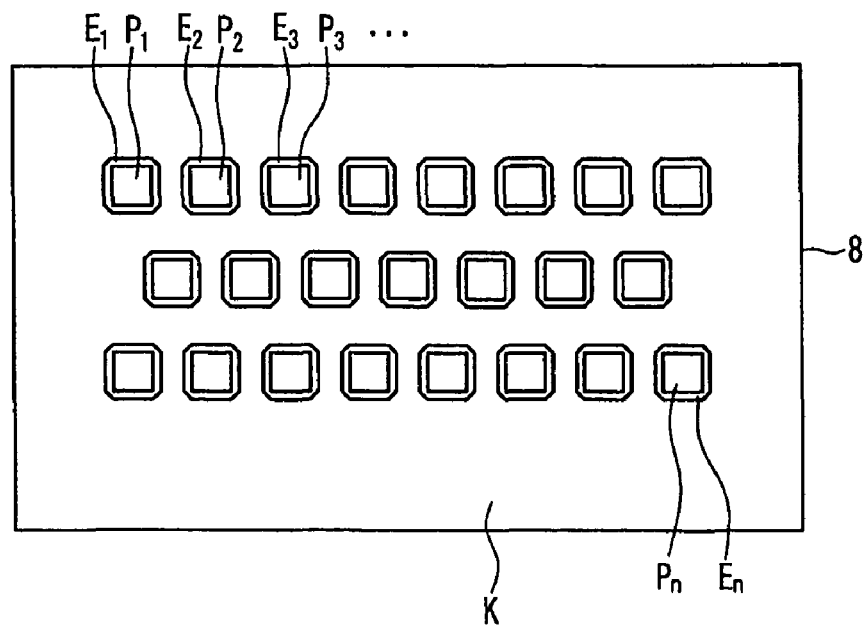
FIG. 17 is a schematic view of a keyboard part of the body part of the information equipment seen from above.

FIG. 17 is a schematic view of the keyboard part K of the body part 8 according to the present embodiment seen from above. As shown in FIG. 17, the keyboard part K of the body part 8 is provided with a plurality of input keys $P_1$ to $P_n$. Furthermore, on the peripheries of the respective input keys $P_1$ to $P_n$, gaps $E_1$ to $E_n$ formed so as to provide the input keys $P_1$ to $P_n$ are placed. In the information equipment 7 according to the present embodiment, heat can be exhausted from the gaps $E_1$ to $E_n$ on the peripheries of the input keys $P_1$ to $P_n$ as well as the exhaust ports 21a to 21d. More specifically, the heat in the information equipment 7 can be dissipated into the air through the gaps $E_1$ to $E_n$ on the peripheries of the input keys $P_1$ to $P_n$.

Figure 18:
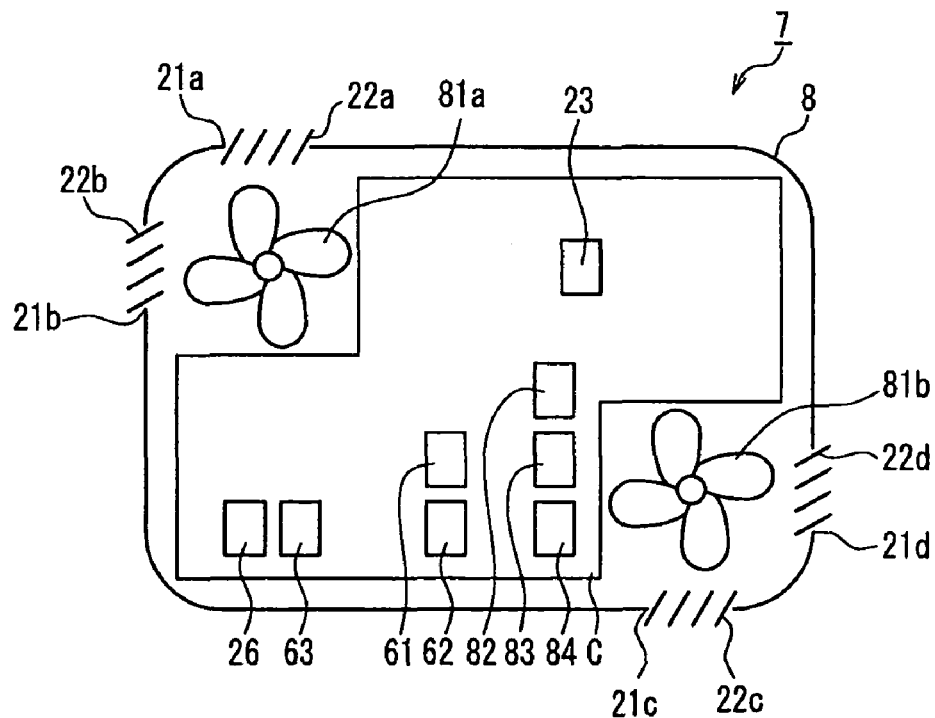
FIG. 18 is a schematic view showing an internal configuration of the body part seen from above in the case where the body part is cut along a plane composed of a line A-A' and a line B-B' shown in FIG. 16B.

FIG. 18 is a schematic view showing an internal configuration of the body part 8 seen from above in the case where the body part 8 is cut along a plane composed of a line A-A' and a line B-B' shown in FIG. 16. More specifically, cooling fans 81a, 81b are provided in the body part 8, instead of the cooling fan 24 shown in FIG. 10. In the present embodiment, when the cooling fans 81a, 81b rotate clockwise (in a right-handed direction), the heat in the body part 8 can be dissipated into the air from the gaps $E_1$ to $E_n$ of the keyboard part K as well as the exhaust ports 21a to 21d. Furthermore, when the cooling fans 81a, 81b rotate counterclockwise (in a left-handed direction), the heat in the body part 8 can be dissipated into the air from the exhaust ports 21a to 21d. More specifically, if the cooling fans 81a, 81b rotate counterclockwise (in a left-handed direction), the heat in the body part 8 is not dissipated into the air from the gaps $E_1$ to $E_n$ of the keyboard part K.

Furthermore, on the substrate C in the body part 8, a rotation detecting sensor 82 and a use mode detecting part 83 are provided. On the substrate C in the body part 8, the heat dissipation control part 84 is provided instead of the heat dissipation control part 63 shown in FIG. 10.

The rotation detecting sensor 82 detects the rotation angle of the hinge part 9 and outputs the detected rotation angle. Herein, in the present embodiment, if the rotation angle of the hinge part 9 is "0", the display part 3 is assumed to be in the notebook PC mode. Furthermore, if the rotation angle of the hinge part 9 is "180", the display part 3 is assumed to be in the tablet mode.

Figure 19:
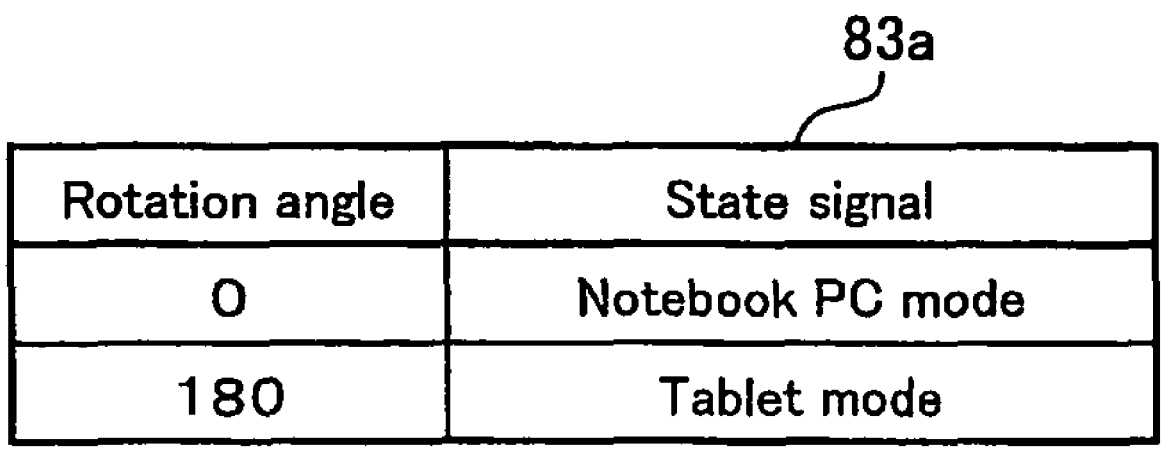
FIG. 19 is a diagram showing an example of data recorded in a use mode detection table.

The use mode detecting part 83 detects in which of at least two use modes the user is using the information equipment 7, in accordance with the rotation angle output from the rotation detecting sensor 82. In the present embodiment, the use mode detecting part 83 detects in which of the notebook PC mode and the tablet mode the user is using the information equipment 7, in accordance with the rotation angle of the hinge part 9. Therefore, the use mode detecting part 83 has a use mode detection table 83a. FIG. 19 is a diagram illustrating an example of data recorded in the use mode detection table 83a according to the present embodiment. As shown in FIG. 19, two patterns of a combination of a rotation angle and a state signal are recorded in the use mode detection table 83a.

Specifically, the use mode detecting part 83 compares the rotation angle output from the rotation detecting sensor 82 with the rotation angles recorded in the use mode detection table 83a, thereby detecting the use mode (state signal) in which the user is using the information equipment 7.

Herein, for example, in the case where the rotation angle output from the rotation detecting sensor 82 is "180", the use mode of the information equipment 7 is a tablet mode. Therefore, the use mode detecting part 83 extracts the state signal indicating the tablet mode from the use mode detection table 83a. Furthermore, for example, in the case where the rotation angle output from the rotation detecting sensor 82 is "0", the use mode of the information equipment 7 is the notebook PC mode. Therefore, the use mode detecting part 83 extracts the state signal indicating the notebook PC mode from the use mode detection table 83a. The use mode detecting part 83 outputs the extracted state signal to the heat dissipation control part 84.

The heat dissipation control part 84 controls the rotation directions of the cooling fans 81a, 81b in accordance with the state signal output from the use mode detecting part 83.

In the present embodiment, if the state signal output from the use mode detecting part 83 indicates the notebook PC mode, the heat dissipation control part 84 controls the rotation directions of the cooling fans 81a, 81b so that the rotation directions of the cooling fans 81a, 81b become counterclockwise directions (left-handed directions). Thus, the heat in the body part 8 can be dissipated into the air only from the exhaust ports 21a to 21d without being dissipated into the air from the gaps $E_1$ to $E_n$ of the keyboard part K. That is, although the user needs to operate the input keys $P_1$ to $P_n$ of the keyboard part K of the body part 8, the hand of the user operating the input keys $P_1$ to $P_n$ does not become hot by preventing the heat from being exhausted from the gaps $E_1$ to $E_n$ of the keyboard part K. Consequently, the user can be prevented from being given a disagreeable feeling.

Furthermore, if the state signal output from the use mode detecting part 83 indicates the tablet mode, the heat dissipation control part 84 controls the rotation directions of the cooling fans 81a, 81b so that the rotation directions of the cooling fans 81a, 81b become clockwise directions (right-handed directions). Thus, the heat in the body part 8 can be dissipated into the air from the exhaust ports 21a to 21d and the gaps $E_1$ to $E_n$ of the keyboard part K. That is, due to the tablet mode, the user cannot operate the input keys $P_1$ to $P_n$ of the keyboard part K of the body part 8. Therefore, even if the heat is exhausted from the gaps $E_1$ to $E_n$ of the keyboard part K, the exhausted heat is not directed to the user. Consequently, the heat in the body part 8 can be dissipated into the air efficiently through the exhaust ports 21a to 21d and the gaps $E_1$ to $E_n$ of the keyboard part K.

In the above, an example in which the heat dissipation control part 84 controls the rotation directions of the cooling fans 81a, 81b in accordance with the state signal output from the use mode detecting part 83 has been described. However, the present invention is not limited thereto. For example, the heat dissipation control part 84 may control the open/closed states of the open/close mechanisms by providing the gaps $E_1$ to $E_n$ on the peripheries of the input keys $P_1$ to $P_n$ with the open/close mechanisms for opening/closing the gaps $E_1$ to $E_n$. Specifically, if the state signal output from the use mode detecting part 83 indicates the notebook PC mode, the heat dissipation control part 84 places the open/close mechanisms provided in the gaps $E_1$ to $E_n$ in a closed state. Furthermore, if the state signal output from the use mode detecting part 83 indicates the tablet mode, the heat dissipation control part 84 places the open/close mechanisms provided in the gaps $E_1$ to $E_n$ in an open state. Thus, the effects similar to those in the case where the heat dissipation control part 84 controls the rotation directions of the cooling fans 81a, 81b are obtained.

Furthermore, in the case where the heat dissipation control part 84 outputs control signals indicating "Close" respectively to the open/close mechanisms 22a, 22b, the heat dissipation control part 84 may output a stop signal for stopping rotation to the cooling fan 81a. Furthermore, in the case where the heat dissipation control part 84 outputs control signals indicating "Close" respectively to the open/close mechanisms 22c, 22d, the heat dissipation control part 84 may output a stop signal for stopping rotation to the cooling fan 81b. Thus, the unnecessary rotations of the cooling fans 81a, 81b can be suppressed, so that the power consumption of the information equipment 7 can be suppressed.

Figure 20:
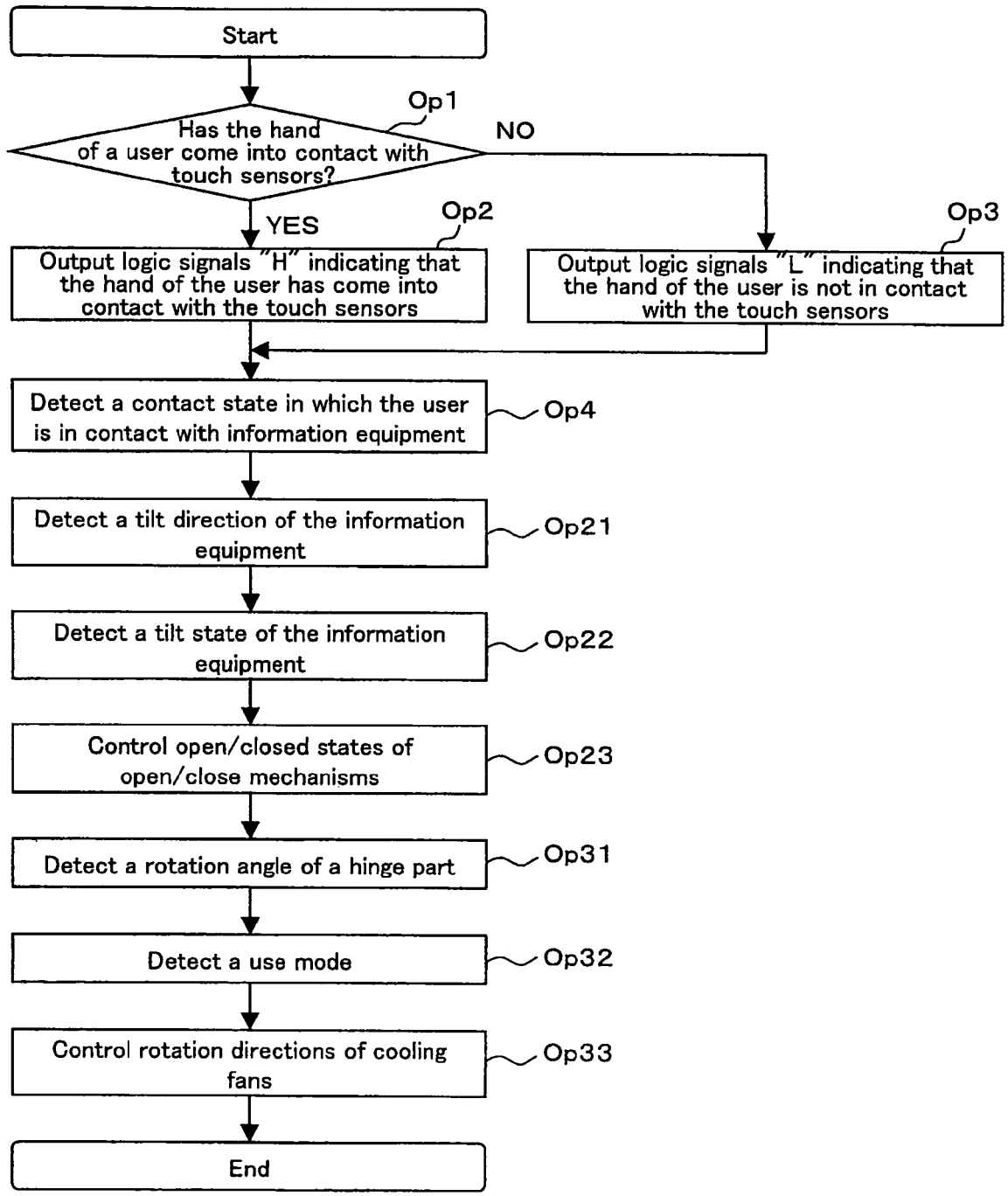
FIG. 20 is a flowchart illustrating an example of an operation of the information equipment.

Next, the operation of the information equipment 7 according to the above configuration will be described with reference to FIG. 20. In FIG. 20, portions indicating the processings similar to those in FIG. 15 are denoted with the same reference numerals as those therein, and the detailed description thereof will be omitted.

FIG. 20 is a flowchart illustrating an example of the operation of the information equipment 7. As shown in FIG. 20, after Op23, the rotation detecting sensor 82 detects a rotation angle of the hinge part 9 (Op31). Then, the use mode detecting part 83 detects in which of at least two use modes the user is using the information equipment 7 (state signal) in accordance with the rotation angle detected in Op31 (Op32). Then, the heat dissipation control part 84 controls the rotation directions of the cooling fans 81a, 81b in accordance with the state signal detected in Op32 (Op33).

In FIG. 20, although the processings in Op1 to Op4 and Op21 to Op23, and the processings in Op31 to Op33 are performed in series, the processings in Op1 to Op4 and Op21 to Op23, and the processings in Op31 to Op33 may be performed in parallel.

As described above, in the information equipment 7 according to the present embodiment, the use mode detecting part 83 detects in which of at least two use modes the user is using the information equipment 7, in accordance with the rotation angle of the hinge part 9. The heat dissipation control part 84 controls the cooling fans 81a, 81b or the open/closed states of the open/close mechanisms 22a to 22d so that the heat exhausted from the exhaust ports 21a to 21d is not directed to the hand of the user that is in contact with or is close to the information equipment 7 in accordance with the use mode. Thus, the heat in the information equipment 7 can be dissipated into the air through exhaust ports without causing time and labor for the user and without giving the user a disagreeable feeling.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information equipment having a plurality of exhaust ports, comprising:
   an open/close mechanism that opens or closes the exhaust ports;
   a radiator that dissipates heat in the information equipment into air through the exhaust ports,
   a user state detecting part that is disposed in a vicinity and corresponding to the exhaust ports and detects a contact state in which a hand of a user is in contact with the information equipment or a closeness state in which the hand of the user is in the vicinity of the information equipment; and
   a heat dissipation control part that controls an open/closed state of the open/close mechanism so that the exhaust ports corresponding to the user state detection part which has detected the state in which a hand of a user is in contact with or in the vicinity of the information equipment is set in the closed state, and is set in the opened state when the user state detecting part has sequentially detected the state in which the hand of the user is not in contact with or in the vicinity of the information equipment.

2. An information equipment having a plurality of exhaust ports, comprising:
- an open/close mechanism that opens or closes the exhaust ports;
- a radiator that dissipates heat in the information equipment into air through the exhaust ports,
- a user state detecting part that is disposed in a vicinity and corresponding to the exhaust ports and detects a contact state in which a hand of a user is in contact with the information equipment or a closeness state in which the hand of the user is in the vicinity of the information equipment;
- a heat dissipation control part that controls an open/closed state of the open/close mechanism so that the exhaust ports corresponding to the user state detection part which has detected the state in which a hand of a user is in contact with or in the vicinity of the information equipment is set in the closed state; and
- a tilt state detecting part that detects a tilt state indicating a direction in which the information equipment tilts with respect to a horizontal plane,
- wherein the heat dissipation control part controls the open/closed state of the open/close mechanism so that heat exhausted from the exhaust ports is not directed to the user, in accordance with the tilt state detected by the tilt state detecting part.

3. The information equipment according to claim 2, wherein, in a case where a tilt angle at which the information equipment tilts with respect to a horizontal plane is a threshold value of more, the heat dissipation control part controls the open/closed state of the open/close mechanism so that heat exhausted from the exhaust ports is not directed to the user.

4. An information equipment having a plurality of exhaust ports, comprising:
- an open/close mechanism that opens or closes the exhaust ports;
- a radiator that dissipates heat in the information equipment into air through the exhaust ports,
- a user state detecting part that is disposed in a vicinity and corresponding to the exhaust ports and detects a contact state in which a hand of a user is in contact with the information equipment or a closeness state in which the hand of the user is in the vicinity of the information equipment,
- a heat dissipation control part that controls an open/closed state of the open/close mechanism so that the exhaust ports corresponding to the user state detection part which has detected the state in which a hand of a user is in contact with or in the vicinity of the information equipment is set in the closed state
- a body part;
- a hinge part connected to the body part;
- a display part that is rotatably supported by the body part via the hinge part; and
- a use mode detecting part that detects in which of at least two use modes the user is using the information equipment, in accordance with a rotation angle of the hinge part,
- wherein the heat dissipation control part controls the radiator or the open/closed state of the open/close mechanism so that heat exhausted from the exhaust ports is not directed to the hand of the user that is in contact with or in the vicinity of the information equipment, in accordance with the use mode detected by the use mode detecting part.

* * * * *